United States Patent
Alhozaimy et al.

(10) Patent No.: US 11,384,015 B1
(45) Date of Patent: Jul. 12, 2022

(54) CORROSION-PREVENTING ADDITIVE FOR REINFORCED CONCRETE

(71) Applicants: Abdulrahman Alhozaimy, Riyadh (SA); Raja Rizwan Hussain, Riyadh (SA); Abdulaziz Al-Negheimish, Riyadh (SA)

(72) Inventors: Abdulrahman Alhozaimy, Riyadh (SA); Raja Rizwan Hussain, Riyadh (SA); Abdulaziz Al-Negheimish, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 17/530,263

(22) Filed: Nov. 18, 2021

(51) Int. Cl.
*C04B 22/06* (2006.01)
*C04B 7/02* (2006.01)
*C04B 103/61* (2006.01)

(52) U.S. Cl.
CPC .............. *C04B 22/06* (2013.01); *C04B 7/02* (2013.01); *C04B 2103/61* (2013.01)

(58) Field of Classification Search
CPC ........ C04B 7/02; C04B 22/06; C04B 2103/61
See application file for complete search history.

(56) References Cited

U.S. PATENT DOCUMENTS

| | | | |
|---|---|---|---|
| 3,953,222 | A | 4/1976 | Bainton |
| 3,982,954 | A | 9/1976 | Jeskey |
| 5,554,352 | A | 9/1996 | Jaques et al. |
| 8,038,789 | B2 | 10/2011 | Boxley |
| 8,293,006 | B2 | 10/2012 | Alhozaimy et al. |
| 8,323,399 | B2 | 12/2012 | Guynn et al. |
| 9,469,769 | B1 * | 10/2016 | Hussain ................... C09D 5/08 |
| 10,301,218 | B1 | 5/2019 | Khan et al. |

FOREIGN PATENT DOCUMENTS

| | | |
|---|---|---|
| CA | 2598302 A1 | 8/2006 |
| KR | 101820435 B1 | 1/2018 |

OTHER PUBLICATIONS

Moufti et al "Assessment of the industrial utilization of scoria materials in central Harrat Rahat, Saudi Arabia", Engineering Geology 57, 155-162. (Year: 2000).*
Alraddadi etal, "Effect of thermal treatment on the structural, electrical, and dielectric properties of volcanic scoria", Journal of Materials Science: Materials in Electronics, 31:11688-11699. (Year: 2020).*
Fares et al., "Evaluation of Powdered Scoria Rocks from Various Volcanic Lava Fields as Cementitious Material," Journal of Materials in Civil Engineering, 28(3), Sep. 2015.
"Corrosion of Embedded Metals", Portland Cement Association, web page printed from www.cement.org/learn/concrete-technology/durability/corrosion-of-embedded-materials.html on Nov. 3, 2021, 7 pages.
Fajardo et al., "Corrosion of steel rebar in natural pozzolan based mortars exposed to chlorides", Construction and Building Materials (2009), vol. 23, pp. 768-774.

* cited by examiner

*Primary Examiner* — Anthony J Green
(74) *Attorney, Agent, or Firm* — Nath, Goldberg & Meyer; Richard C. Litman

(57) ABSTRACT

The corrosion-preventing additive for reinforced concrete is a concrete additive for preventing corrosion of steel rebars in steel-reinforced concrete. The corrosion-preventing additive is powdered scoria, including concentrations of about 45 wt % $SiO_2$, 14 wt % $Fe_2O_3$, and 15.5 wt % $Al_2O_3$, with the remainder being standard components found in volcanic rock. The average particle size of the powdered scoria is 45 microns or less. Reinforced concrete treated with the corrosion-preventing additive includes a mixture of an aggregate, water, and cement (such as Portland cement), along with at least one steel rebar embedded in the mixture, and the powdered scoria.

8 Claims, 5 Drawing Sheets

CORROSION-PREVENTING ADDITIVE FOR REINFORCED CONCRETE

BACKGROUND

1. Field

The disclosure of the present patent application relates to a corrosion inhibitor, and particularly to a corrosion-preventing additive for reinforced concrete to provide protection against chloride-induced corrosion of steel rebars in reinforced concrete.

2. Description of the Related Art

Steel rebar is commonly used for the reinforcement of concrete. Typically, manufactured steel rebar is often coated with black oxide (i.e., "mill scale"), which is a mixture of three phases of iron oxide, namely wüstite (FeO) near the steel surface, magnetite ($Fe_3O_4$) above the layer of wüstite, and a top portion of the scale formed from hematite ($\alpha$-$Fe_2O_3$). These layers of different phases of iron oxide develop cracks, since their coefficients of expansion and compaction due to changes in temperature differ to a more significant extent than those of the underlying steel structure.

Rebars covered in mill scale, along with rust, are incorrectly considered to provide protection against corrosive attack on their surfaces when embedded in concrete. The presence of the mill scale actually accelerates corrosive reactions. This is due to the cracks that form in the scale, as well as the presence of unstable oxides of iron. Both the cracks and the unstable iron oxides are conducive to the formation of galvanic cells, which accelerate corrosive reactions in the rebar.

Due to the problems associated with mill scale, descaling of the rebar prior to its embedding in concrete may be performed. Although descaling improves the general corrosion resistance of the rebar, and also increases the threshold chloride concentration for the onset of a corrosion pitting attack, the process of descaling (typically conducted on-site) is very expensive, time-consuming, and requires cumbersome equipment. Other methods include surface coating, the use of corrosion inhibitors, and the application of cathodic protection. However, the compositions and methods involved for each of these techniques are not only expensive, but have a tendency to affect the quality of the concrete, as well as the bond strength between the concrete and the rebar.

Pozzolans are a broad class of siliceous or siliceous and aluminous materials, which, in themselves, possess little or no cementitious value, but which will, in finely divided form and in the presence of water, react chemically with calcium hydroxide ($CaOH_2$) at ordinary temperature to form compounds possessing cementitious properties. The quantification of the capacity of a pozzolan to react with calcium hydroxide and water is given by measuring its pozzolanic activity.

The general definition of a pozzolan embraces a large number of materials that vary widely in terms of origin, composition and properties. Both natural and artificial materials may show pozzolanic activity and are used as supplementary cementitious materials. Artificial pozzolans can be produced deliberately, for instance, by thermal activation of kaolin-clays to obtain metakaolin, or can be obtained as waste or by-products from a high-temperature process, such as fly ashes from coal-fired electricity production. The most commonly used pozzolans today are industrial by-products, such as fly ash, silica fume from silicon smelting, highly reactive metakaolin, and burned organic matter residues rich in silica, such as rice husk ash. Their use has been firmly established and regulated in many countries. However, the supply of high-quality pozzolanic by-products is limited, and many local sources are already fully exploited.

Natural pozzolanas are abundant in certain locations and are extensively used as an addition to Portland cement in such countries as Italy, Germany, Greece and China. Volcanic ashes and pumices largely composed of volcanic glass are commonly used, as are deposits in which the volcanic glass has been altered to zeolites by interaction with alkaline waters. Although such natural pozzolanas are already in use as an additive to Portland cement in ordinary concrete, their use has not yet been adapted to steel reinforced concrete, particularly for improving the protective effects of the passive film layer formed on steel rebar embedded in the concrete. Thus, a corrosion-preventing additive for reinforced concrete solving the aforementioned problems is desired.

SUMMARY

The corrosion-preventing additive for reinforced concrete is a concrete additive for preventing corrosion of steel rebars in steel-reinforced concrete. The corrosion-preventing additive is powdered scoria, including concentrations of about 45 wt % $SiO_2$, 14 wt % $Fe_2O_3$, and 15.5 wt % $Al_2O_3$, with the remainder being standard components found in volcanic rock. The scoria is mined from a volcanic rock field located at Harrat Rahat, Harrat Habesha and Harrat Hutaymah in Saudi Arabia. The scoria is then milled to a particle size of 45 microns or less.

Reinforced concrete treated with the corrosion-preventing additive includes a mixture of an aggregate, water, and cement (such as Portland cement), together with at least one steel rebar embedded in the mixture and the powdered scoria. The wt/wt ratio of the cement to the powdered scoria may be between about 90:10 and 70:30, preferably about 80:20.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The corrosion-preventing additive for reinforced concrete is a concrete additive for preventing corrosion of steel rebars in steel-reinforced concrete. The corrosion-preventing additive is processed scoria (a highly vesicular volcanic rock), which, when blended with or when partially replacing Portland cement in concrete mixtures, improves the protective properties of the passive film formed on the surfaces of the steel reinforcement bars. The scoria is mined from a volcanic rock field, which is located at Harrat Rahat, Harrat Habesha and Harrat Hutaymah in Saudi Arabia. The scoria is then milled to a particle size of 45 microns or less. This powdered scoria includes 45 wt % $SiO_2$, 14 wt % $Fe_2O_3$, and 15.5 wt % $Al_2O_3$, with the remainder being standard components found in volcanic rock, including CaO, MgO, $SO_3$, $TiO_2$, $Na_2O$, $K_2O$, and chlorides. The concentrations of $SiO_2$, $Fe_2O_3$ and $Al_2O_3$ in the powdered scoria meet the ASTM C618 requirements for a pozzolanic material, which require the total combined wt % of $SiO_2$, $Fe_2O_3$ and $Al_2O_3$ to be at least 70 wt %. The powdered scoria is mixed with hydraulic cement, such as Portland cement, as an additive or partial replacement therefor in the concrete mix.

Figure 1:
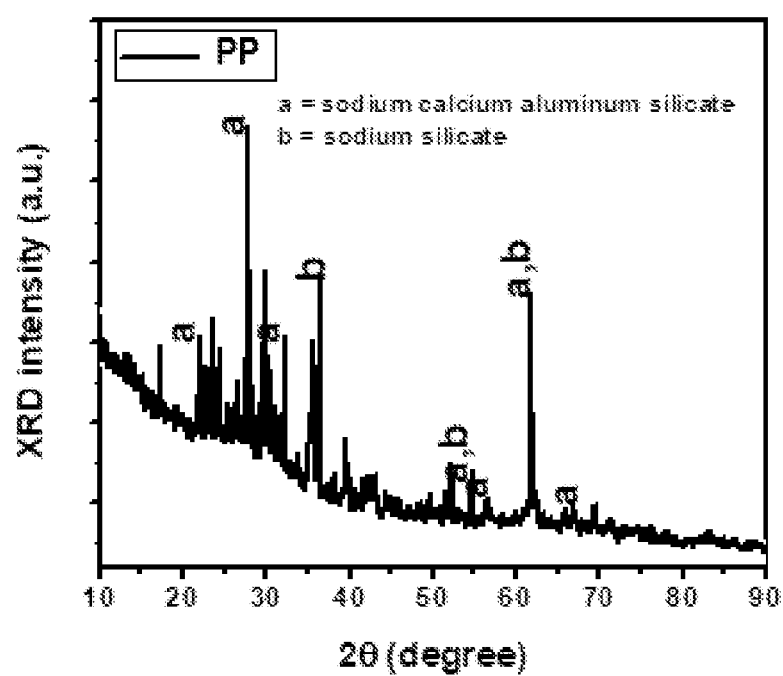
FIG. 1 is an X-ray diffraction (XRD) diffractogram for samples of processed pozzolan (PP) of a corrosion-preventing additive for reinforced concrete.

For convenience, hereinafter, the processed scoria having concentrations of 45 wt % $SiO_2$, 14 wt % $Fe_2O_3$, and 15.5 wt % $Al_2O_3$, as described above, will be referred to as processed pozzolan (PP). The concentrations of the $SiO_2$, $Fe_2O_3$ and $Al_2O_3$ in the PP were determined by X-ray diffraction (XRD). The results of the XRD analysis are shown in FIG. 1, particularly indicating the major phases of sodium silicate and sodium calcium aluminum silicate in the PP.

Figure 2:
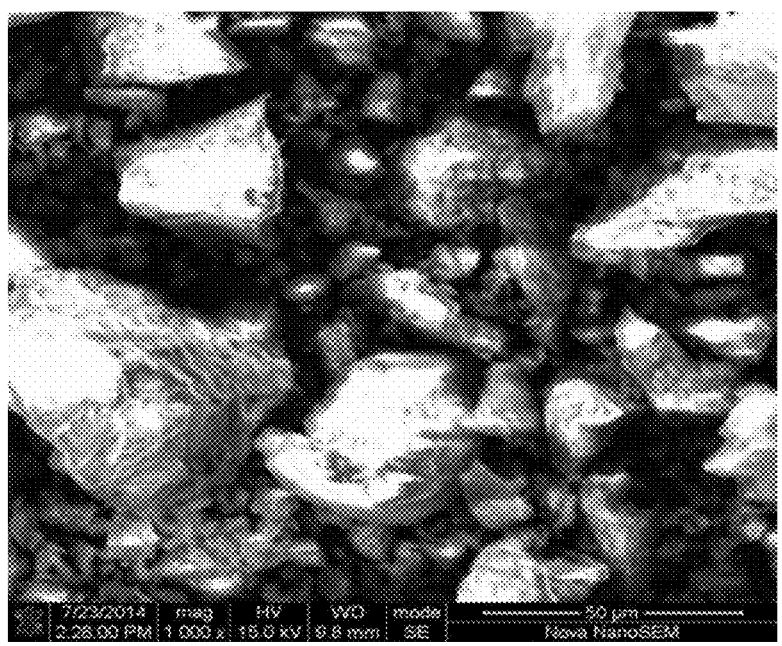
FIG. 2 is a scanning electron microscope (SEM) micrograph of particles of a sample of PP of the corrosion-preventing additive for reinforced concrete.

The morphologies of the particles present in the PP were examined by scanning electron microscope (SEM), and an SEM image of the particles of the PP is shown in FIG. 2. FIG. 2 shows an average particle size of between 5 μm and 25 μm. Additionally, the pH of the PP in water was examined by blending 5 g of PP with 100 mL of distilled water, followed by agitation at a high stirring rate for 72 hours in a sealed, air-tight container. Table 1, below, shows the results of measuring the pH at room temperature. As can be seen in Table 1, the PP is low in alkalinity and has little effect in raising the pH of distilled water. It should be noted that in other types of common pozzolanic materials, the increase in pH is much higher. For purposes of further comparison, Table 2 below shows the results of making similar pH measurements with a lime-saturated solution, where the results of adding 50% PP were measured. For this test, the mixture was vigorously stirred in a sealed container for 192 hours and the pH was measured at room temperature (25° C.).

TABLE 1

Measured pH of Distilled Water at Room Temperature

| | pH | | |
|---|---|---|---|
| Substance | After 2 hours | After 24 hours | After 72 hours |
| Distilled water | 6.05 | 6.05 | 6.05 |
| Distilled water with 5% PP | 9.71 | 9.08 | 8.38 |

TABLE 2

Measured pH of Lime-Saturated Solution at Room Temperature

| Substance | pH |
|---|---|
| 300 mL of lime-saturated solution | 12.50 |
| 200 mL of lime-saturated solution with 100 g of PP | 11.27 |

It can be seen in Table 2 that the PP will not impart alkalinity to the pore solution of concrete/mortar. The siliceous materials of the PP react with lime to form C-S-H gel, which is beneficial for the cast concrete. Table 3 shows the measured results of metallic cations released (measured in ppm) after 50% weight/volume (w/v) pozzolan was mixed and stirred for 72 hours in lime-saturated solution in a sealed, air-tight container at 25° C. From these results, it can be seen that siliceous material is leached out in concrete pore solution from the PP. Further, the calcium ion, after blending of the PP in the lime-saturated solution, is reduced nearly by one-half, which indicates that the lime reacted with the PP to form insoluble C-S-H gel.

TABLE 3

Measured Metallic Cations

| | Concentration of Metallic Cations (ppm) | | | | | |
|---|---|---|---|---|---|---|
| Solution | Al | Ca | S | Si | Na | K |
| Lime-saturated solution | — | 0.85 | — | — | 29 | 22 |
| Lime-saturated solution blended with 50% PP | 69.4 | 0.4 | 19.08 | 433.5 | 1602 | 30 |

The polarization resistance of the rebars was measured by electrochemical impedance spectroscopy (EIS). In this technique, a sinusoidal voltage of 10 mV was introduced at the corroding interface at their corrosion potentials. The frequencies of the sinusoidal voltage were varied between 100 KHz to 0.001 Hz. The resulting impedance and shift in phase with changes in frequencies were monitored using a potentiostat. For determination of polarization resistance and other impedance parameters of the corroding surfaces in the presence (and the absence) of admixtures, a constant phase element (CPE) model was used to extract data. Polarization resistance measured by this technique is inversely related to the corrosion current density ($I_{corr}$) and follows the Stern-Geary equation:

$$I_{corr} = B/R_p,$$

where B is a constant and $R_p$ is the polarization resistance (measured in $\Omega \cdot cm^2$). The Stern-Geary equation shows that the corrosion current density, and thus the corrosion rate of a corroding metal-electrolyte interface, has an inverse relationship with $R_p$.

Figure 3:
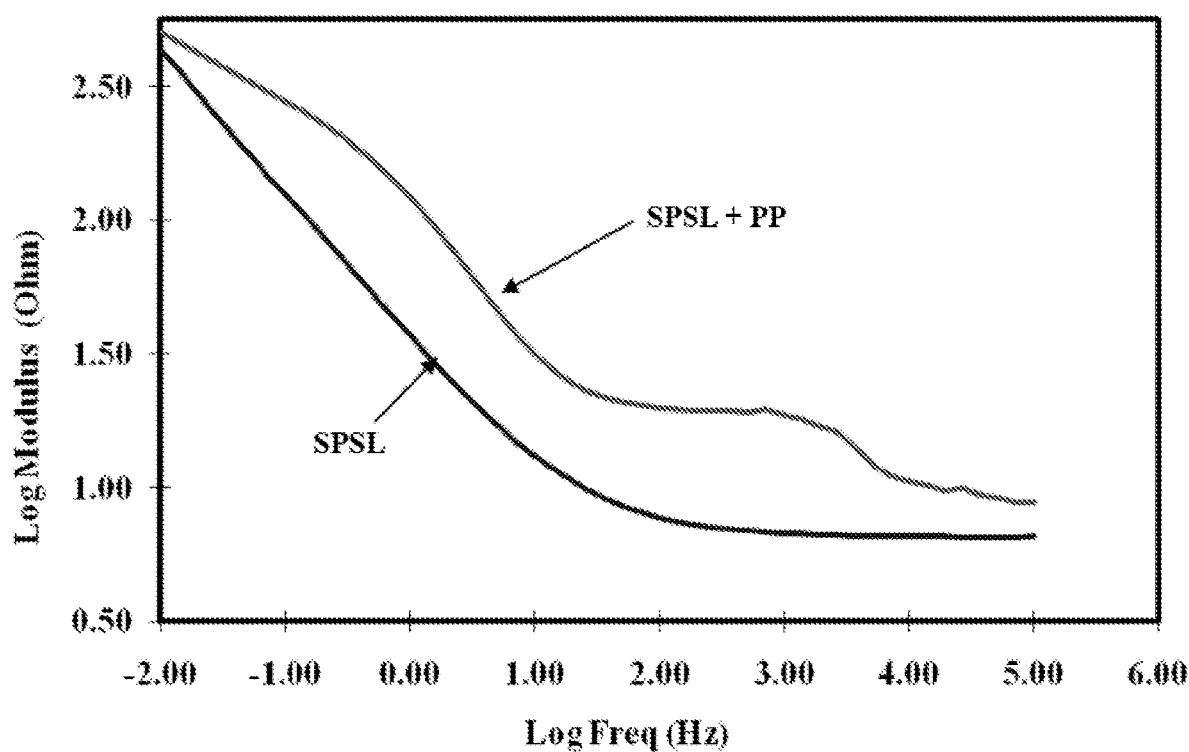
FIG. 3 is a composite electrochemical impedance spectroscopic (EIS) or Bode plot (log of impedance modulus v. log of frequency) comparing control samples of steel rebar embedded in concrete (SPSL) with samples of steel rebar embedded in concrete and treated with the corrosion-preventing additive (SPSL+PP).

The passive film of the steel rebars provides a measure of protection against chloride corrosion, and the addition of PP to the concrete mix is found to improve this protection. The steel rebars embedded in mortars/concrete remain immune to corrosive attack due to the high alkalinity of pore solution imparted by the Portland cement. The addition of the PP modifies the pores of the cast, making the cast concrete more compact and dense, and reducing the diffusion of chloride, oxygen, moisture and other acidic gases through the concrete to reach the surface of the embedded steel bars. In addition to having a pozzolanic effect, the PP also improves the protective properties of the passive film formed on the surface of the rebars, which can be seen through electrochemical impedance spectroscopy and polarization studies performed on steel rebars directly exposed to concrete pore solution. The electrochemical impedance spectroscopic (EIS) plots of FIG. 3 show that adding PP to the synthetic pore solution (SPSL) improves the corrosion resistance of the steel rebar's passive film to a considerable extent.

Figure 4:
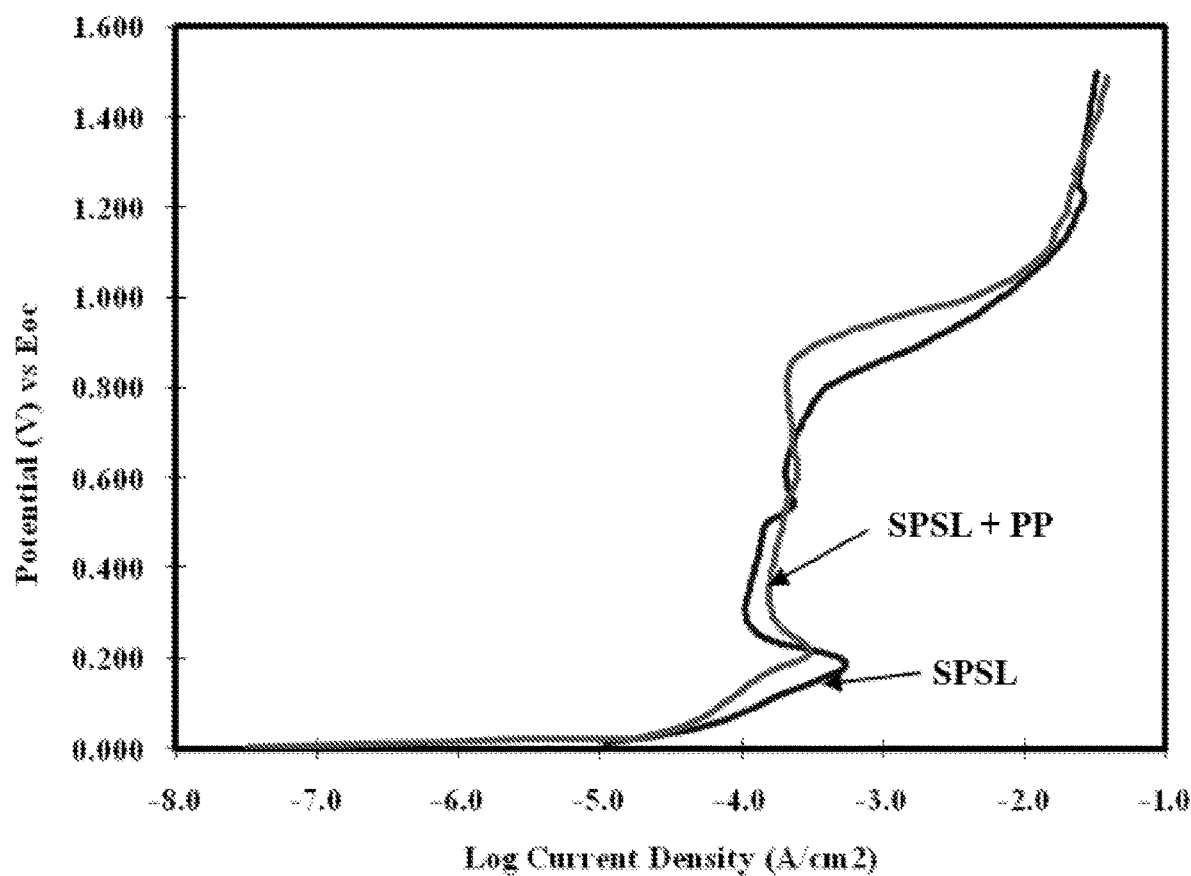
FIG. 4 is a composite potentiodynamic EIS anodic polarization plot (potential v. log of current density) comparing control samples of steel rebar embedded in concrete (SPSL) with samples of steel rebar embedded in concrete and treated with the corrosion-preventing additive (SPSL+PP).

In the anodic polarization plots of FIG. 4, it can be seen that the surface of the steel rebar gains anodic protection in the presence of PP in concrete pore solution+0.6M Cl ions. Apart from corrosion current density, the most noticeable effect is on pitting potential ($E_{pit}$). For a control solution (without PP), the rebar surface experiences pitting attack at 0.81 V (SCE). After blending with the PP, the $E_{pit}$ value becomes more positive (0.88V (SCE)), which indicates that blending of the PP in the concrete and mortar improves the pitting resistance of steel rebar. This clearly shows the inhibitive role of the PP on pitting attack of chloride ions on steel rebars. FIG. 4 particularly shows the effect of the PP in improving the polarization and pitting ($E_{pit}$) resistance of steel rebar exposed for 768 hours in concrete pore solution+ 0.6M Cl ions.

Figure 5:
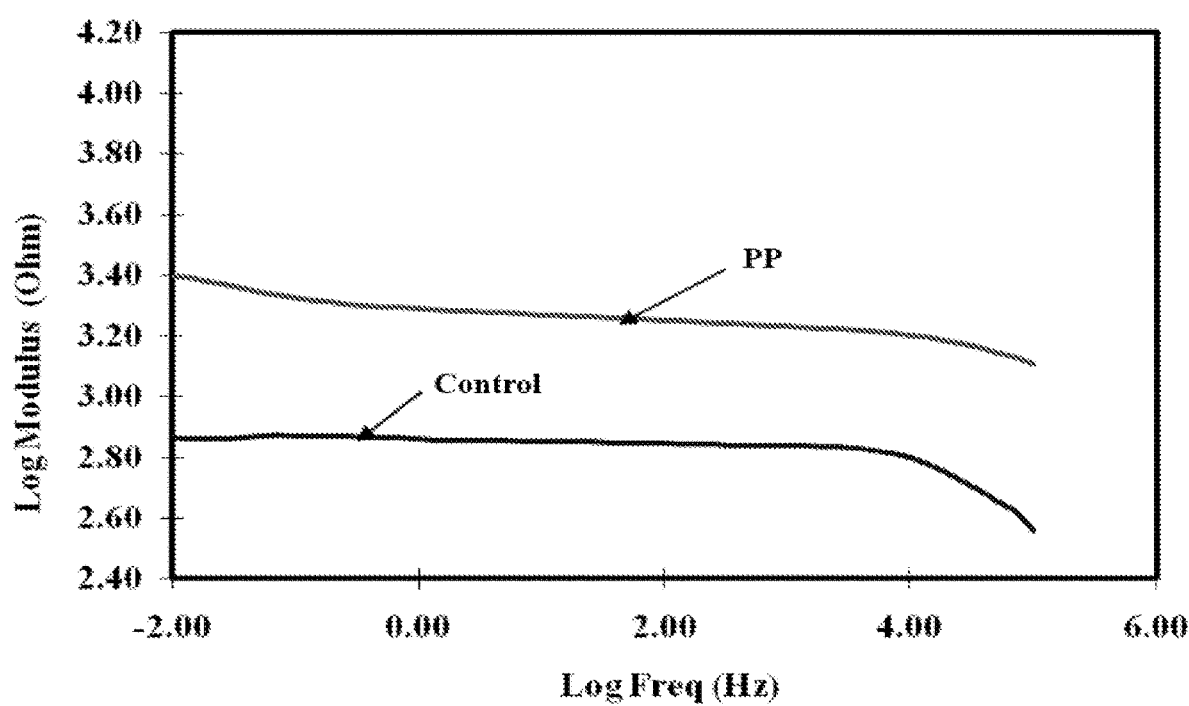
FIG. 5 is a composite EIS or Bode plot comparing control samples of steel rebar embedded in concrete with samples of steel rebar embedded in concrete and treated with the corrosion-preventing additive for reinforced concrete (PP—20% by weight Portland cement replaced by pozzolan).

For the EIS plots of FIG. 5, two types of the mortars were cast: one with ordinary Portland cement (OPC), and the other replacing 20% (by mass) of OPC with PP. In both cases, the water-to-cement ratio was maintained at 0.5. Mild steel rebars with diameters of 16 mm were embedded in both types of mortar. After 28 days of curing via the standard procedure, the mortars were subjected to a wet/dry cycle in 5% sodium chloride solution, with 7 days held in the dipped state, and three days of drying at 55° C. After 7 cycles of testing, the electrochemical impedance spectra for the embedded rebars were recorded. The plots, showing log frequency vs. log modulus of impedance, are shown in FIG. 5, where the conjoint effect of the pozzolan, by pozzolanic reactions and an improvement in passive film of the embedded rebars in the cast mortars, can be seen.

It should be understood that other types of pozzolanic material may be used to improve the pitting and corrosion resistance of steel rebar embedded in concrete, such as silica flume, fly ash, and the like.

It is to be understood that the corrosion-preventing additive for reinforced concrete is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A corrosion-preventing additive for reinforced concrete for providing corrosion resistance to steel rebars in said reinforced concrete, comprising: powdered scoria, the powdered scoria having about 45 wt % $SiO_2$, 14 wt % $Fe_2O_3$, and 15.5 wt % $Al_2O_3$, whereby the powdered scoria and cement in the reinforced concrete form a corrosion-resistant passive film layer in an interfacial area where the powdered scoria and the cement are in direct contact with said steel rebars embedded in the reinforced concrete due to anodic polarization of said steel rebars where the powdered scoria and the cement are in direct contact with said steel rebars, thereby providing corrosion resistance to protect said steel rebars from corrosion.

2. The corrosion-preventing additive for reinforced concrete as recited in claim 1, wherein the powdered scoria has an average particle size of up to 45 microns.

3. The corrosion-preventing additive according to claim 1, wherein said scoria comprises scoria obtained from Harrat Rahat, Harrat Habesha or Harrat Hutaymah on the Arabian Peninsula in Saudi Arabia.

4. Reinforced concrete treated with a corrosion-preventing additive for providing corrosion resistance to steel rebars in said reinforced concrete, comprising:
a mixture of an aggregate, water, and cement;
at least one steel rebar embedded in the mixture; and
a corrosion-preventing additive added to the mixture, the corrosion-preventing additive comprising powdered scoria, the powdered scoria having about 45 wt % $SiO_2$, 14 wt % $Fe_2O_3$, and 15.5 wt % $Al_2O_3$, whereby the powdered scoria and cement in the reinforced concrete form a corrosion-resistant passive film layer in an interfacial area where the powdered scoria and the cement are in direct contact with said at least one steel rebar embedded in the reinforced concrete due to anodic polarization of said at least one steel rebar where the powdered scoria and the cement are in direct contact with said at least one steel rebar, thereby providing corrosion resistance to protect the at least one steel rebar from corrosion.

5. The reinforced concrete with a corrosion-preventing additive as recited in claim 4, wherein the powdered scoria has an average particle size of up to 45 microns.

6. The reinforced concrete according to claim 4, wherein said scoria comprises scoria obtained from Harrat Rahat, Harrat Habesha or Harrat Hutaymah on the Arabian Peninsula in Saudi Arabia.

7. The reinforced concrete with a corrosion-preventing additive as recited in claim 4, wherein the cement has a wt/wt ratio to the powdered scoria between 90:10 and 70:30.

8. The reinforced concrete with a corrosion-preventing additive as recited in claim 4, wherein the cement has a wt/wt ratio to the powdered scoria of 80:20.

* * * * *